Jan. 21, 1964     E. T. GETZ ETAL     3,118,312
PULLEY DEVICE
Filed Jan. 5, 1962
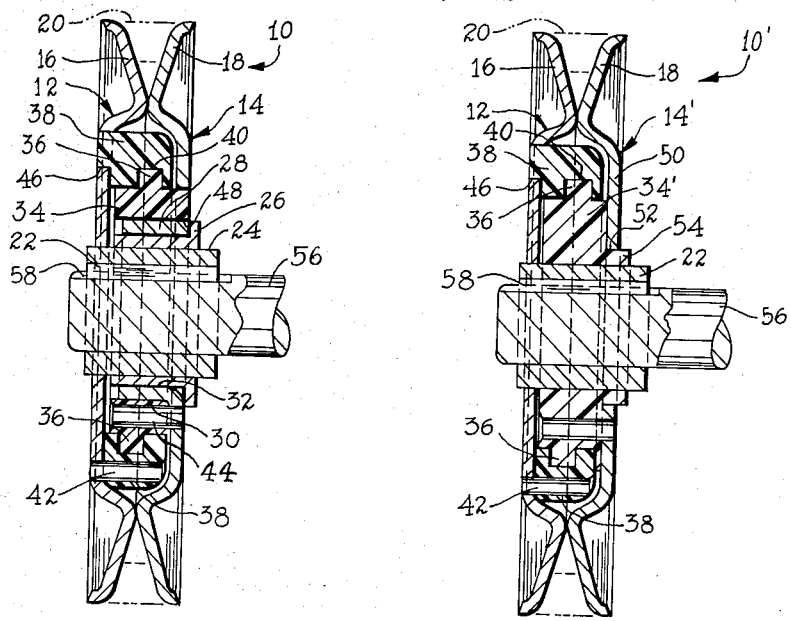
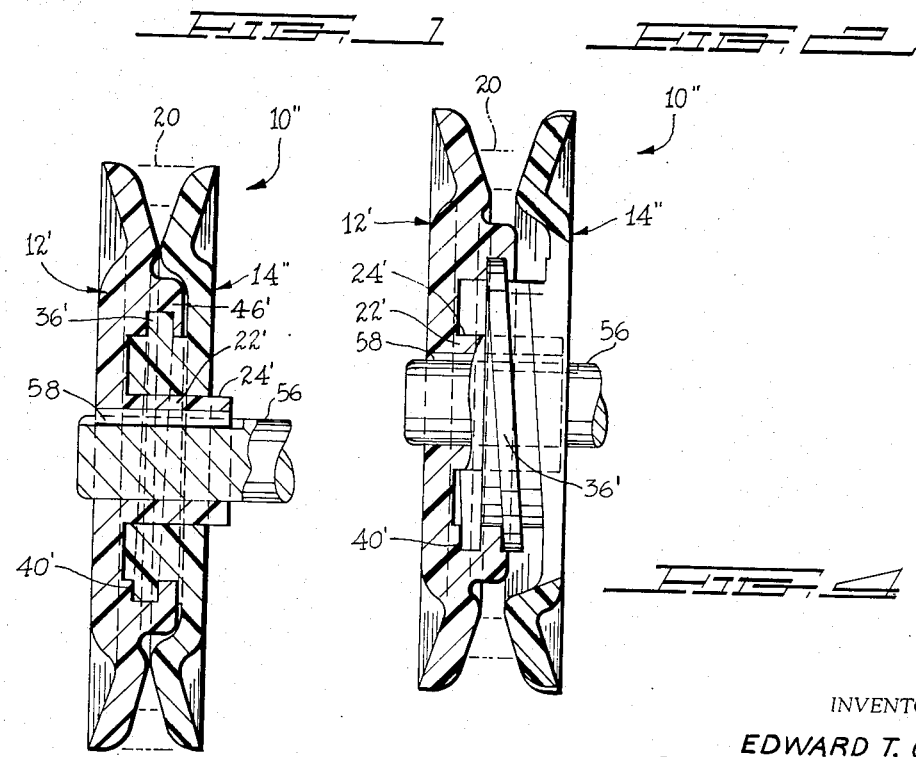
INVENTOR.
EDWARD T. GETZ
BY MATTHEW PACAK

United States Patent Office 3,118,312
Patented Jan. 21, 1964

3,118,312
PULLEY DEVICE
Edward T. Getz, Cleveland Heights, and Matthew Pacak, Solon, Ohio, assignors to Eaton Manufacturing Company, Cleveland, Ohio, a corporation of Ohio
Filed Jan. 5, 1962, Ser. No. 164,514
14 Claims. (Cl. 74—230.17)

Broadly, this invention relates to torque transmitting devices of the pulley type but more specifically, pertains to a self-compensating pulley operable to adjust for slippage occurring between the sheave halves and the driving means engageable therewith, due to increased loads imposed on the device during operation.

To date, there are numerous self-compensating pulleys which utilize the basic principle of providing a control means cooperable with the pulley which upon response to slippage or drag occurring at increased loads on the pulley, will reduce the distance between the sheave halves in an effort to increase the working or effective pitch diameter of the pulley and accordingly, relieve the slack in the belt or similar such driving means passing therebetween. The particular application of a self-compensating pulley is desirable in situations where it is necessary to take up slack or slippage in a belt type driving means extending between the sheave halves. When the use of a flexible belt as a driving means is extensive and variations in loads are continuous, stretching or similar permanent deformation will occur, thus increasing the overall length of the belt reducing tension therein and accordingly, allow slippage between the sheave halves reducing the load carrying capabilities of the pulley. To overcome this problem in pulley operation, the novel concept presented herein utilizes the basic principle of self-compensation and incorporates a means therein which accomplishes this function in a simple and unique manner.

Therefore, a principal object of this invention is to provide a novel torque transmitting pulley capable of automatically compensating for lengthening of a belt type driving means through the use of cooperably engageable members axially disposed between the sheave halves.

It is another object of this invention to provide a novel self-compensating torque transmitting pulley wherein the compensating means for belt lengthening is radially disposed of the hub portion of the pulley and axially disposed intermediate the sheave halves.

It is still another object of this invention to provide a novel self-compensating torque transmitting pulley device wherein the sheaves halves are laterally disposed on each side of the compensating means and wherein one sheave half provides a bearing surface for the other sheave half.

A further object of this invention is to provide a novel torque transmitting pulley device wherein the structure can be made in two parts and of molded nylon.

These and other objects of the invention will become apparent from the following description taken in connection with the drawing in which:

FIGURE 1 is a cross-sectional view of the pulley structure illustrating therein the cooperating means which provides self-compensation for belt lengthening and the relationship of the means with the sheave structure.

FIGURE 2 is a cross-sectional view of a modification of the novel pulley device wherein the cooperating portions of the assembly providing the self-compensation and their relationship with the hub and sheave halves are illustrated.

FIGURE 3 is a cross-sectional view of another modification of the pulley formed entirely of molded nylon illustrating the formation of the compensating feature with the sheave halves whereby two parts are required for the assembly.

FIGURE 4 is a cross-sectional view of one sheave half and a partial cross-sectional view of the other sheave half of the pulley of FIGURE 3 illustrating therein the relative cooperation between the self-compensating elements and the disposition of one sheave half with respect to the other upon assembly, in providing the self-compensating feature.

Referring directly to the drawing, FIGURE 1 thereof, the pulley 10 comprises a pair of sheave halves 12 and 14 axially spaced with respect to one another. The sheave halves 12 and 14 are formed in a manner whereby their radial outer portions 16 and 18, respectively, upon assembly, form a V-shaped groove therebetween into which a belt 20 (dotted lines) is receivable. The particular configuration of the V-groove of FIGURE 1 can be made by casting or preferably stamping the pulley material into the particular shape of the sheave halves disclosed.

At the radial innermost portion of the sheave halves, the half 12 has a substantially circular opening formed therein adaptable to receive an annular hub 22 secured to the half 12 by a press-fit, staking or other suitable operation. The hub 22 has a bearing surface 24 thereon engageable with a bushing member 26. The bushing 26 is cooperable with and structurally locates sheave half 14 with respect to the other half 12. Radially disposed from and engageable with the bushing 26 is an axially extending portion 28 of the sheave half 14 which is formed in a manner whereby it extends in a direction parallel to the axis of rotation of the pulley 10. The surface 30 of the portion 28 defines an opening in the sheave half 14 and is adapted to circumscribe the bushing 26 at its outer surface 32 thereof. Accordingly, the engagement of the bushing with the innermost portion 28 of the sheave half 14 through a press-fit or other suitable type of engagement rigidly secures the sheave half 14 to the bushing 26. The surface portion 24 of the hub acts as a bearing surface on which a journal type support of the bushing 26 is provided. This structural arrangement allows relative rotation of the bushing with respect to the hub 22 upon actuation thereof due to the lengthening of the belt 20. Radially outwardly disposed of the axially directed portion 28 and the hub 22 is an insert 34 having an externally threaded portion 36 thereon secured to the sheave half 14 and engageable with insert 38 which has a cooperable internally threaded portion 40 thereon fixed to the sheave half 12. The externally threaded insert 34 is secured to the sheave half 14 for conjoint rotation therewith in substantially the same manner as insert 38 is secured to the sheave half 12. Fastening pins 42 (one shown) extend axially through the internally threaded insert 38 into securing engagement with the sheave half 12. Pins 44 (one shown) in like manner extend through the externally threaded insert 34 into securing engagement with the sheave half 14. From this cooperable arrangement of the externally and internally threaded inserts and the relationship of the sheave half 14 with the bushing 26 and the hub 22, relative rotation between the sheave halves can be readily obtained. Openings 46 and 48 are formed in the sheave halves 12 and 14, respectively, and are adapted to receive a portion of the inserts 38 and 36, respectively therein, which provide adidtional securement of the inserts to the sheave halves.

In the preferred embodiment of this invention, the inserts 34 and 38 are formed of a molded nylon material. In determining the most suitable insert material for the instant application of the novel concept, the characteristics of bearing quality wherein a low coefficient of friction is desirable, resiliency, reasonable dimensional stability, strength and its adaptability to be molded were analyzed. Of particular importance, a resilient material having a low coefficient of friction capable of functioning as a bearing surface is preferred in that inconsistent loading on the pulley structure results in considerable strain on the cooperating parts performing the self-compensating function thereby tending to produce excessive noise. The resilient nature of the material suffices to provide a damping effect in the self-compensating unit and results in a comparatively noiseless pulley operation. Further, the bearing quality of the material enables the cooperable engagement of the hub 22 and bushing 26 as well as the hub and externally threaded insert shown in FIGURES 2, 3 and 4 of the drawing which will hereinafter be discussed. In view of the above requirements, nylon as the basic material has obtained the optimum operational characteristics of the pulley structure.

During operation of the pulley, the loss of tension in the belt and the corresponding lengthening thereof results in slippage of the belt across the surface of the V-shaped portion 16 of the sheave half 12 which tends to rotate the sheave half 14 relative to the sheave half 12. This relative movement causes the sheave half 14 to move axially inwardly toward sheave half 12. With this relative movement, the axial relocation of the sheave half 14 reduces the space or distance therebetween and thereby increases the effective diameter of the pulley reducing or substantially eliminating any slack existing in the belt 20.

Alternative structures which incorporate the novel concept presented herein are illustrated in FIGURES 2, 3 and 4. The modifications of the pulley structure of FIGURE 1 shown in FIGURES 2, 3 and 4 comprise novel structural arrangements of the basic parts described in the specification relative to FIGURE 1. In referring to the above mentioned figures of the drawing, the parts of the pulley of FIGURE 1 remain identical with the exception that in FIGURE 2 the externally threaded nylon insert 34 and the bushing 26 are integrally formed to provide insert 34' and which accordingly is journalled onto the hub 22. The reconstruction of the externally threaded insert 34 to form the insert 34' necessitates that the formation of the sheave half 14 of FIGURE 1 be modified. By eliminating the axially directed portion 28 of the sheave half 14, a wall portion 50 of the sheave half 14' is formed, directed radially inwardly whereby an opening 52 formed in the wall portion of the sheave half 14' engages shoulder 54 extending axially outwardly from the insert 34' and disposed radially intermediate the hub 22 and the wall portion 50. This modification eliminates the need of providing an additional part such as the bushing 26 and the press-fitting operation in securing same with the axially directed portion 28 of the sheave half 14 of FIGURE 1. The sheave halves 12 and 14' of the pulley of FIGURE 2 are secured to the inserts by pins used in the substantially identical manner as shown in FIGURE 1. However, openings 46 and 48 in the sheave halves 12 and 14 of FIGURE 1 are not necessary to maintain secured engagement of the sheave halves of FIGURE 2 with the inserts thereof.

The modification of the novel pulley structure illustrated in FIGURE 3 comprises a pair of molded nylon sheave halves 12' and 14". The sheave half 12' is formed so that the radial innermost portion thereof is molded in an axially outward direction to form a hub 22'. The sheave half 14" is radially disposed from the hub 22' in engagement with a surface 24' of the hub. The formation of the sheave half 14" of FIGURES 3 and 4 include the molding into an integral construction, the nylon insert 34' of FIGURE 2 having the externally threaded portion 36' thereon. In like manner, the nylon insert 38 of FIGURE 2 having the internally threaded portion 40 thereon is molded integral with the sheave half 12 of FIGURE 2 to provide the unitary structure 12' having the threaded portion 46' thereon.

In each of the pulley structures depicted in FIGURES 1 through 4, a shaft 56 is secured to the pulley by a key 58 or other suitable means wherein the shaft is connected to a structure (not shown) to which torque transmitted from the belt to the pulley is to be imparted.

The operation of the pulley of FIGURES 3 and 4 is substantially identical to the operation of the pulleys of FIGURES 1 and 2 in that relative rotation of the sheave half 14" with respect to the hub 22' in an axially inward direction substantially increases the effective diameter of the pulley. The relative rotation above referred to is induced by the lack of tension in the belt due to the lengthening thereof through extended usage. When slack in the belt occurs, it results in slippage of the belt across the surface portion of the V-groove of the sheave half 12' which is transferred to the sheave half 14". At this point in the operation, the threaded portions 36' and 40' engage whereby the sheave half 14" rotates in a clockwise direction (FIGURE 4) and moves axially inwardly toward the sheave half 12' thus increasing the effective diameter of the pulley providing proper tension in the belt by eliminating any slack therein.

While this invention has been described in connection with certain specific embodiments, the principle involved is capable of numerous other applications that would readily occur to persons skilled in the art. The invention, therefore, is limited only as indicated by the scope of the appended claims.

We claim:
1. A pulley device for maintaining constant tension on a driving means cooperable therewith, comprising:
   a pair of sheave halves defining the effective diameter of said pulley and cooperable with said driving means disposed therethrough;
   a hub member conjointly rotatable with one of said sheave halves and supporting the other sheave half of said pair for relative rotation thereon;
   cooperable means disposed intermediate of and engaging said sheave halves and having threaded portions thereon, said threaded portions being radially spaced outwardly from said hub member, said cooperable means effective to control relative rotation of one of said sheave halves of said pair to vary the effective diameter of said pulley to maintain said tension on said driving means.

2. A self-compensating pulley device for maintaining constant tension on a driving means cooperable therewith, comprising:
   a hub;
   a pair of sheave halves cooperable with said hub defining the effective diameter of said pulley and adaptable to receive said driving means therebetween, one of said sheave halves being conjointly rotatable with said hub with the other sheave half being supported on said hub to allow limited axial movement thereon and limited rotation relative to the other sheave half of said pair and said hub;
   cooperable means disposed intermediate of and engaging said sheave halves and having threaded portions thereon with said threaded portions being radially spaced from said hub, said cooperable means effective upon induced relative rotation of one of said sheave halves to vary the axial movement thereof and to vary the effective diameter of said pulley to maintain said tension on said driving means.

3. A self-compensating pulley device for maintaining constant tension on a driving means cooperable therewith, comprising:
   a hub;
   a pair of sheave halves cooperable with said hub defining the effective diameter of said pulley and adaptable to receive said driving means therebetween, one of said sheave halves being conjointly rotatable with said hub with said other sheave half of said pair being relatively rotatable with said hub and supported thereon;
   a pair of means disposed axially between said sheave halves, one means of said pair having an externally threaded portion thereon cooperable with the other means of said pair having an internally threaded portion thereon, said means engaging said sheave halves and said threaded portions being radially spaced from said hub, said means operable to vary the effective diameter of said pulley upon relative rotation of one of said sheave halves to maintain said constant tension on said driving means.

4. A self-compensating pulley device for maintaining constant tension on a driving means cooperable therewith, comprising:
   a hub member;
   a pair of axially spaced sheave halves cooperable with said hub, one of said sheave halves being fixed to said hub member with the other sheave half of said pair being supported by said hub and relatively rotatable therewith, said sheave halves defining the effective diameter of said pulley and operable to receive said driving means therebetween;
   an insert member having an externally threaded portion thereon and fixed to one of said sheave halves of said pair;
   an insert member having an internally threaded portion thereon and fixed to the other sheave half of said pair; said insert members being cooperably threaded with said threaded portions being radially spaced from said hub member and independently operable with respect to said hub member, said insert members effective to vary the effective diameter of said pulley upon relative rotation of said sheave half journalled onto said hub to maintain said constant tension on said driving means.

5. A force transmitting device of the load responsive self-compensating pulley type comprising:
   a hub member;
   a first sheave half fixed to said hub member for conjoint rotation therewith;
   a second sheave half axially spaced from and relatively rotatable with respect to said first sheave half and supported for rotation by said hub member, said sheave halves defining the effective diameter of said pulley and adapted to receive a driving means therebetween;
   a first insert member having an internally threaded portion thereon fixed to said first sheave half;
   a second insert member having an externally threaded portion thereon fixed to said second sheave half, said threaded portions on said first and second insert members being radially spaced from said hub member and cooperably engageable to vary the effective diameter of said pulley upon relative rotation of said second sheave half responsive to load fluctuations on said pulley to maintain constant tension on said driving means.

6. A force transmitting device of the load responsive self-compensating pulley type comprising:
   a hub member;
   means journalled on and supported by said hub member;
   a first sheave half fixed to said hub member for conjoint rotation therewith;
   a second sheave half axially spaced from and relatively rotatable with respect to said first sheave half and engageable with said means, said sheave halves defining the effective diameter of said pulley and adapted to receive a driving means therebetween;
   a first insert member fixed to said first sheave half and having an internally threaded portion thereon;
   a second insert member fixed to said second sheave half and having an externally threaded portion thereon, said threaded portions of said insert members being disposed axially intermediate said sheave halves and radially spaced outwardly from said means and being cooperably engageable to vary the effective diameter of said pulley upon relative rotation of said second sheave half responsive to load fluctuations on said pulley to maintain constant tension on said driving means.

7. A force transmitting device of the load responsive self-compensating pulley type according to claim 6 wherein said means journalled on and supported by said hub member comprises a bushing and wherein said bushing is press-fitted into engagement with said second sheave half.

8. A force transmitting device of the load responsive self-compensating pulley type according to claim 6 wherein said insert members are formed of molded nylon material.

9. A pulley device for maintaining constant tension on a driving means cooperable therewith, comprising:
   a hub member;
   a first sheave half fixed to said hub member for conjoint rotation therewith;
   a second sheave half axially spaced from and relatively rotatable with respect to said first half, said sheave halves define the effective diameter of said pulley and are adapted to receive a driving means therebetween;
   a first insert member fixed to said first sheave half and having an internally threaded portion thereon; a second insert member fixed to said second sheave half engageable with and supported for rotation about said hub member, and having an externally threaded portion thereon, said threaded portions of said insert members being radially spaced outwardly from said hub member and cooperable to vary the effective diameter of said pulley upon relative rotation of said second sheave half responsive to load fluctuations thereon to maintain constant tension on said driving means.

10. A pulley device for maintaining constant tension on a driving means cooperable therewith according to claim 9 wherein said externally threaded portion of said second insert member is radially spaced from a bearing surface on said second insert member engageable with said hub member and wherein said externally threaded portion and said bearing surface are formed as a unitary structure.

11. A pulley device for maintaining constant tension on a driving means cooperable therewith according to claim 9 wherein said insert members are formed of molded nylon material.

12. A self-compensating pulley device for maintaining constant tension on a driving means cooperable therewith, comprising:
   a hub member;
   a first sheave half formed integral with said hub member;
   a second sheave half axially spaced from and relatively rotatable with respect to said first sheave half, said sheave halves defining the effective diameter of said pulley and are adapted to receive a driving means therebetween;
   a first insert member having an internally threaded portion thereon formed integral with said first sheave half;
   a second insert member having an externally threaded portion thereon formed integral with said second sheave half and engageable with and supported by said hub member, said threaded portions of said insert members being radially spaced outwardly from said hub member and cooperable with one another to vary the effective diameter of said pulley upon relative rotation of said second sheave half responsive to load fluctuations on said pulley to maintain constant tension on said driving means.

13. A self-compensating pulley device for maintaining constant tension on a driving means cooperable therewith, comprising:
   a hub member;
   a pair of axially spaced sheave halves defining the effective diameter of said pulley and operable to receive said driving means therebetween, one of said sheave halves being fixed to said hub member with the other sheave half of said pair being supported by said hub member and relatively rotatable therewith;

said one of said sheave halves including an insert member having an internally threaded portion thereon;

said other sheave half including an insert member having an externally threaded portion thereon, said threaded portions of said insert members being cooperably threaded and radially spaced from said hub member and independently operable with respect to said hub member, said insert members effective to vary the effective diameter of said pulley upon relative rotation of said sheave half journalled onto said hub to maintain constant tension on said driving means.

14. A force transmitting device of the load responsive self-compensating pulley type comprising:

a hub member;

a first sheave half secured to said hub member for conjoint rotation therewith;

a second sheave half supported for rotation by said hub member in axially spaced and relatively rotatable relationship with respect to said first sheave half, said sheave halves defining the effective diameter of said pulley and adapted to receive a driving means therebetween;

said first sheave half including an insert member having an internally threaded portion thereon;

said second sheave half including an insert member having an externally threaded portion thereon; said threaded portions on said insert members being cooperably engageable with and radially spaced from said hub member, and means including said threaded portions to vary the effective diameter of said pulley upon relative rotation of said second sheave half responsive to load fluctuations on said pulley to maintain constant tension on said driving means.

References Cited in the file of this patent

UNITED STATES PATENTS 2,896,460    Mitchell _____ July 28, 1959

FOREIGN PATENTS 169,894    Great Britain _____ Oct. 13, 1921